(No Model.)
W. B. TURNER.
SHAFT COUPLING.
No. 314,206. Patented Mar. 17, 1885.
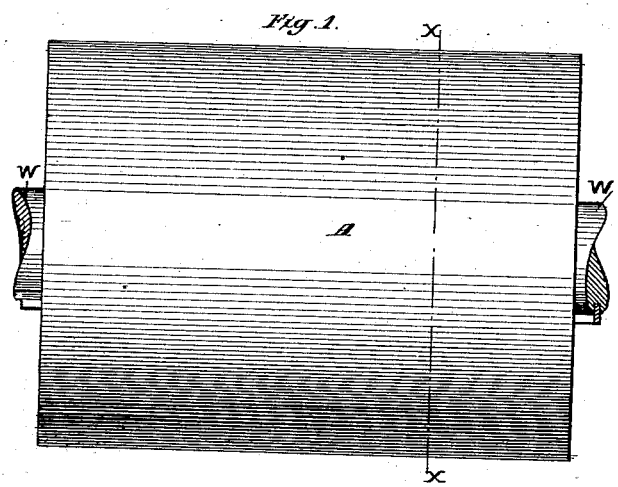
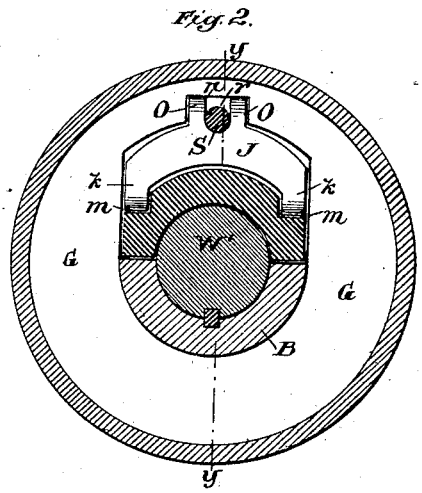
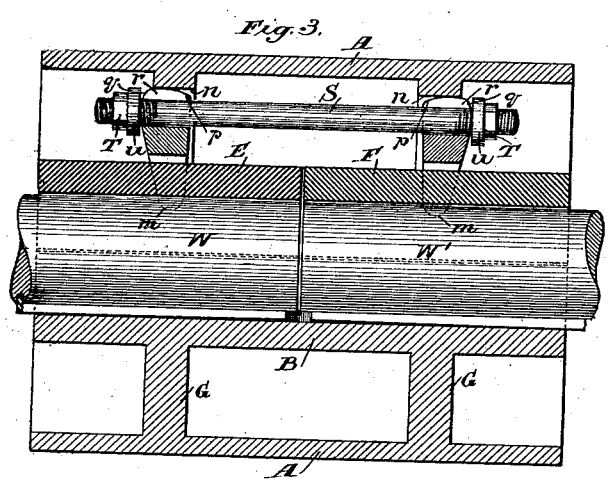
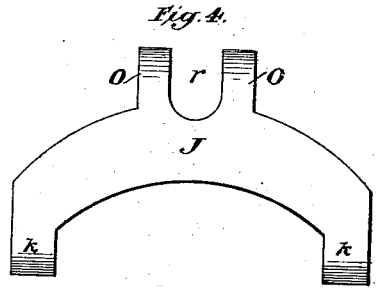
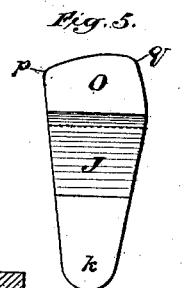
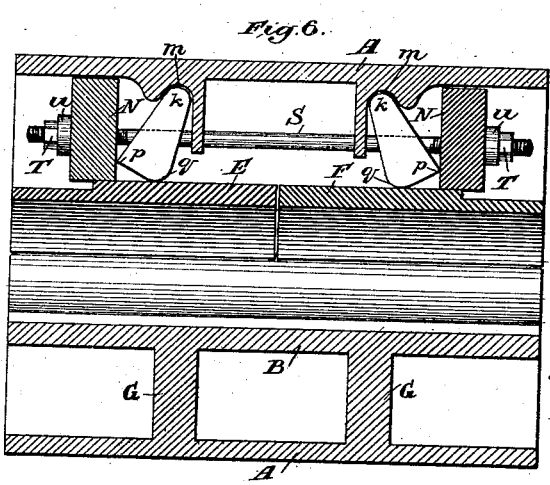
Attest:
Geo. H. Botts.
J. A. Hoory
Inventor:
William B. Turner
By
Munn & Philipp
Attys
N. PETERS, Photo-Lithographer, Washington, D. C.

UNITED STATES PATENT OFFICE.

WILLIAM B. TURNER, OF NEW YORK, N. Y.

SHAFT-COUPLING.

SPECIFICATION forming part of Letters Patent No. 314,206, dated March 17, 1885.

Application filed November 19, 1884. (No model.)

*To all whom it may concern:*

Be it known that I, WILLIAM B. TURNER, a citizen of the United States, residing in the city of New York, county of New York, and State of New York, have invented certain new and useful Improvements in Shaft-Couplings, which improvements are fully described and represented in the following specification and the accompanying drawings, forming a part of the same.

In said drawings, Figure 1 is a side elevation of a coupling embodying my invention. Fig. 2 is a sectional elevation of the same, taken upon the line $x\ x$ of Fig. 1. Fig. 3 is a sectional elevation of the same, taken upon the line $y\ y$ of Fig. 2. Figs. 4 and 5 are enlarged views of a detail, which will be hereinafter explained; and Fig. 6 is a sectional elevation, similar to Fig. 3, illustrating a modified construction, which will be hereinafter referred to.

Referring to said figures, it is to be understood that the body of the coupling therein shown consists of a tubular casing, A, preferably of cylindrical form, which encircles the shafts which are to be coupled, and is provided upon its interior with a bearing for receiving the abutting ends W W' of the shafts which are to be coupled. This bearing is made in two parts, one of which, B, is stationary, and is connected to the casing A by webs or flanges G, and forms a seat for the ends of the shafts, while the other is removable, and is composed of two parts or caps, E F, which rest upon the ends of the shafts and in openings formed in the webs G.

The caps E F are provided upon opposite sides (see Fig. 2) with seats or shoulders $m$, upon which bear the arms $k$ of a pair of cam-levers, J, which are made of the form of yokes, as shown in Figs. 2 and 4, and are arranged to straddle the caps E F. The upper parts, O, of the cam-levers J are curved, so as to form cams $p\ q$, as shown in Figs. 3 and 5, which are arranged to act against bearings $n$, formed upon the interior of the casing A. The parts O of the cams are bifurcated or perforated, so as to provide openings $r$, through which passes a rod or bolt, S, which connects the two cam-levers, and is provided at its ends with nuts T, or with a head and one nut, which can be readily adjusted so as to draw the cam-levers inward, and thus force the caps E F against the ends of the shafts. Washers $u$ may, and preferably will, be placed between the nuts T and the cams.

The operation of the coupling is as follows: The casing A having been placed over the shafts so that the ends W W' rest upon the seat B, the caps E F and cam-levers J will then be inserted through the ends of the casing and placed in position upon the ends of the shafts and the rod S inserted into the openings $r$. One or both of the nuts T will then be tightened so as to draw the cam-levers together, and as this is done the cams $p\ q$ will act upon the bearings $n$ upon the casing, so as to force the caps E F against the ends of the shafts, and thus bind them between the caps and the seat B, so as to couple them together.

It will be seen by reference to Fig. 3 that the cams $p\ q$ are of such form that as they are drawn together they will always bear at the same points upon the bearings $n$, and thus cause the pressure to be applied in the same direction to the caps E F.

To give the coupling a still greater hold upon the shafts, the seat B and the shafts may be recessed and provided with an ordinary key or keys, I, as shown in Fig. 2.

In conclusion, it is to be remarked that the coupling just described may be varied considerably in its details without departing from the principle or losing the advantages of the invention. The cam-levers J, instead of being made in the form of yokes, may be made of the form shown in Fig. 6, and be reversed in position—that is to say, their pivotal ends $k$ may rest in bearings $m$, formed on the casing A, while the cams $p\ q$ act upon the caps E F. In this case the rod S will preferably be provided with followers, as N, to act upon the cam-levers as the nuts are tightened.

It is also to be remarked that in the construction illustrated in Figs. 1 to 5 the cams $p\ q$ may be formed upon the casing A, and in the construction illustrated in Fig. 6 upon the caps E F, instead of upon the levers. Such constructions would not, however, be as desirable as those shown.

It will be seen that in the case of the construction shown in Figs. 1 to 5 any strain upon the two shafts which would tend to draw them apart would have a direct tendency to tighten the hold of the coupling upon them.

It is to be understood that I do not limit myself to two of the cam-levers J, as in large couplings it will sometimes be desirable to use more than two of the cam-levers.

The various parts of the couplings will be made of steel, iron, or other suitable material for the purpose, and will be of sizes proportioned to the size of the shafts which are to be coupled.

What I claim is—

1. In a shaft-coupling, the cam-levers J, substantially as described.

2. In a shaft-coupling, the combination, with the cam-levers J, of the movable caps E F, substantially as described.

3. In a shaft-coupling, the combination, with the cam-levers J and rod S and nut or nuts T, of the movable caps E F, substantially as described.

4. In a shaft-coupling, the combination, with the cam-levers J, of the movable caps E F and stationary seat B, substantially as described.

5. In a shaft-coupling, the combination, with the yoke-shaped cam-levers J, of the movable caps E F, substantially as described.

6. In a shaft-coupling, the combination, with the casing A, of the movable caps E F, levers J, and cams $p\ q$, substantially as described.

In testimony that I claim the foregoing I have hereunto set my hand this 8th day of November, 1884.

WILLIAM B. TURNER.

Witnesses:
HENRY M. LIVOR,
SAMUEL D. COMPTON.